US008341380B2

(12) United States Patent
Deming et al.

(10) Patent No.: US 8,341,380 B2
(45) Date of Patent: Dec. 25, 2012

(54) EFFICIENT MEMORY TRANSLATOR WITH VARIABLE SIZE CACHE LINE COVERAGE

(75) Inventors: James Leroy Deming, Madison, AL (US); Mark Allen Mosley, Guntersville, AL (US); William Craig McKnight, Harvest, AL (US); Emmett M. Kilgrariff, San Jose, CA (US); Steven E. Molnar, Chapel Hill, NC (US); Colyn Scott Case, Hyde Park, VT (US)

(73) Assignee: NVIDIA Corporation, Santa Clara, CA (US)

( * ) Notice: Subject to any disclaimer, the term of this patent is extended or adjusted under 35 U.S.C. 154(b) by 238 days.

(21) Appl. No.: 12/851,483

(22) Filed: Aug. 5, 2010

(65) Prior Publication Data

US 2011/0072235 A1    Mar. 24, 2011

Related U.S. Application Data

(60) Provisional application No. 61/244,849, filed on Sep. 22, 2009.

(51) Int. Cl.
*G06F 12/00* (2006.01)
*G06F 13/00* (2006.01)

(52) U.S. Cl. ......... 711/207; 711/100; 711/154; 711/200

(58) Field of Classification Search .................. 711/100, 711/154, 200, 208
See application file for complete search history.

(56) References Cited

U.S. PATENT DOCUMENTS

| | | | | |
|---|---|---|---|---|
| 5,860,144 A | * | 1/1999 | Frank et al. | 711/206 |
| 5,873,123 A | * | 2/1999 | Patel et al. | 711/202 |
| 6,047,362 A | * | 4/2000 | Zucker | 711/203 |
| 6,112,285 A | * | 8/2000 | Ganapathy et al. | 711/207 |

* cited by examiner

*Primary Examiner* — Tuan V. Thai
(74) *Attorney, Agent, or Firm* — Patterson & Sheridan, LLP

(57) ABSTRACT

One embodiment of the present invention sets forth a system and method for supporting high-throughput virtual to physical address translation using compressed TLB cache lines with variable address range coverage. The amount of memory covered by a TLB cache line depends on the page size and page table entry (PTE) compression level. When a TLB miss occurs, a cache line is allocated with an assumed address range that may be larger or smaller than the address range of the PTE data actually returned. Subsequent requests that hit a cache line with a fill pending are queued until the fill completes. When the fill completes, the cache line's address range is set to the address range of the PTE data returned. Queued requests are replayed and any that fall outside the actual address range are reissued, potentially generating additional misses and fills.

20 Claims, 10 Drawing Sheets

EFFICIENT MEMORY TRANSLATOR WITH VARIABLE SIZE CACHE LINE COVERAGE

CROSS-REFERENCE TO RELATED APPLICATIONS

This application claims priority benefit to U.S. provisional patent application titled, "Efficient Memory Translator with Variable Size Cache Lines," filed on Sep. 22, 2009 and having Ser. No. 61/244,849.

BACKGROUND OF THE INVENTION

1. Field of the Invention

The present invention generally relates to the translation of virtual addresses into physical addresses using a translation lookaside buffer with variable size cache line coverage.

2. Description of the Related Art

Modern graphics processing units (GPU), central processing units (CPU), and operating systems (OS) manage memory using virtual addressing. Application programs and the engines within the GPU and CPU use virtual addresses. The operating system and/or driver allocate physical memory for ranges of virtual addresses and specify the mapping between virtual and physical addresses using page tables. A page table entry (PTE) describes the mapping for a range of virtual addresses to a range of physical addresses. The translation from virtual addresses to physical addresses is performed by a memory management unit (MMU) that may be configured to cache PTEs in order to improve the performance by eliminating the need to read PTEs for every translation. The cache efficiency for the PTEs improves as the coverage of the cache storing the PTEs increases, relative to the virtual address space.

Accordingly, what is needed in the art is a system and method that provides the throughput and efficiency advantages of large pages and highly compressed PTEs, while providing the generality to support poorly compressible PTEs used to describe small buffers.

SUMMARY OF THE INVENTION

A system and method for supporting high-throughput virtual to physical address translation using a translation lookaside buffer (TLB) that stores compressed cache lines, but allows fully general address translation required when compression is not possible due to the allocation of small buffers or memory data structures. The PTEs are compressed and stored in cache lines having variable size coverage. The coverage of the compressed cache line increases; however, determination of cache hits and misses is complicated since the amount of memory covered by the cache line varies based on the compression. Each cache line has a fixed number of bits. The amount of memory covered by the cache line depends on the page size and PTE compression level. When a TLB miss occurs, a cache line is allocated with an assumed address range that may be larger or smaller than the address range of the PTE data actually returned. The assumed size is chosen to be large enough to support high-throughput cases. Subsequent requests that hit a cache line with a fill pending are queued until the fill completes. When the fill completes, the cache line's address range is set to the address range of the PTE data returned. Queued requests are replayed and any that fall outside the actual address range are reissued, potentially generating additional misses and fills. The reissue process allocates one or more cache lines assuming coverage that may be different than the assumed range. The assumed address range is chosen to avoid reissues in the majority of cases. The cache hit rate is improved since additional PTEs may be compressed and stored with the requested PTEs in the cache lines compared with storing only the uncompressed requested PTEs. The invention supports high throughput when pages are large or PTEs are highly compressible and supports full generality when pages are small or PTEs have minimal contiguity.

Various embodiments of a method of the invention for storing page table entries of a translation look-aside buffer in cache lines having variable size coverage include receiving a first page table entry (PTE) request for PTE data that is not stored in the TLB and allocating a first cache line in the TLB for storing the PTE data, where the allocated first cache line is assumed to cover an assumed range of a virtual address space. The PTE data is retrieved from memory and compressed to produce compressed PTE data. The compressed PTE data is stored in the allocated first cache line and an actual range of the virtual address space that is covered by the compressed PTE data is determined. The actual range is stored as an extended range when the actual range is greater than the assumed range. When the actual range is less than the assumed range the actual range replaces the assumed range.

Various embodiments of the invention include a system for storing page table entries in cache lines of a translation look-aside buffer. The system includes a memory that stores page table entry (PTE) data and a translation look-aside buffer (TLB). The TLB is configured to receive a first PTE request for PTE data that is not stored in the TLB and allocate a first cache line in the TLB for storing the PTE data, wherein the allocated first cache line is assumed to cover an assumed range of a virtual address space. The PTE data is retrieved from the memory and the TLB compresses the PTE data to produce compressed PTE data, stores the compressed PTE data in the allocated first cache line, and determines an actual range of the virtual address space that is covered by the compressed PTE data. The TLB store the actual range as an extended range when the actual range is greater than the assumed range. When the actual range is less than the assumed range the TLB replaces the assumed range with the actual range.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
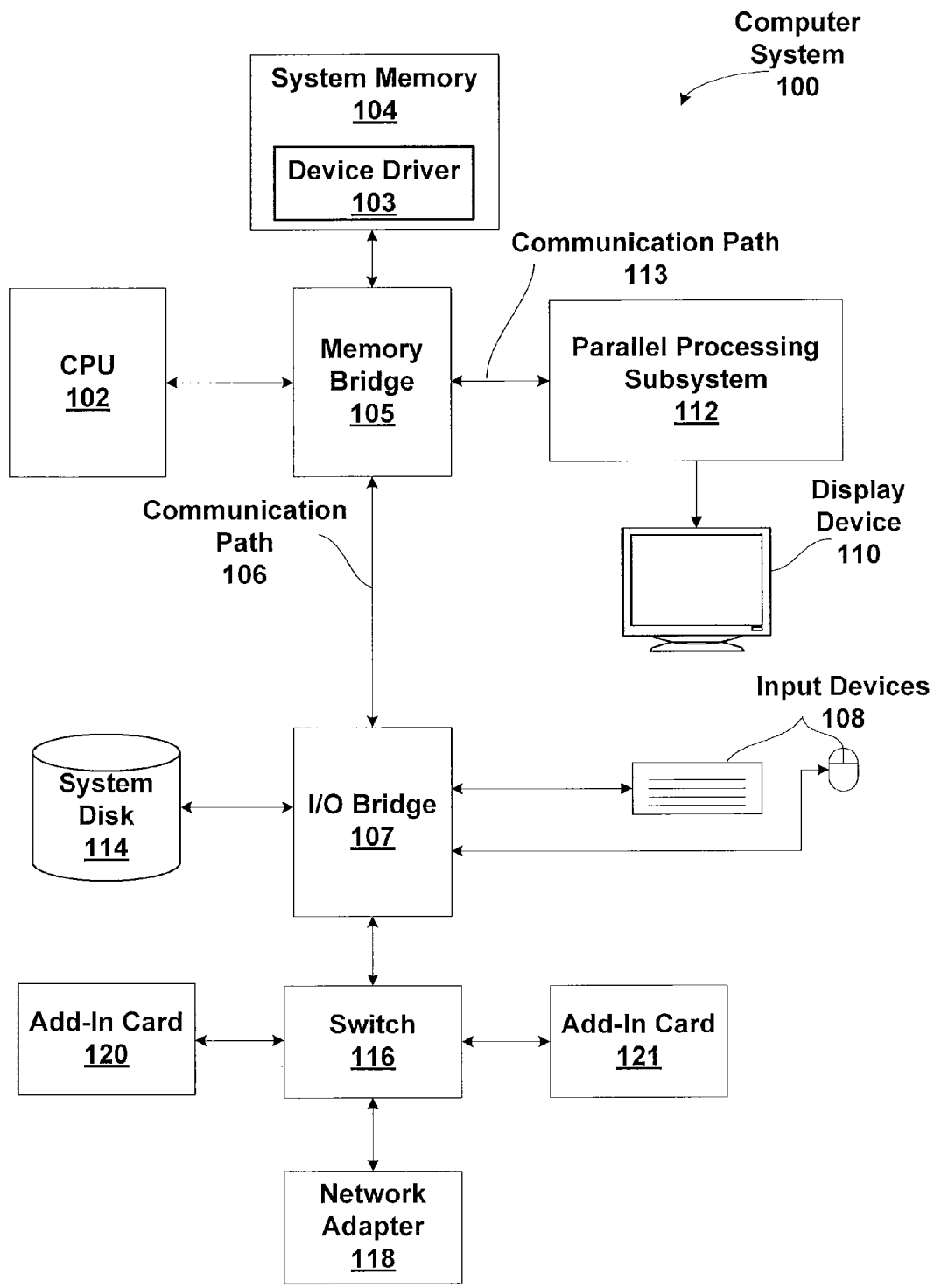
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
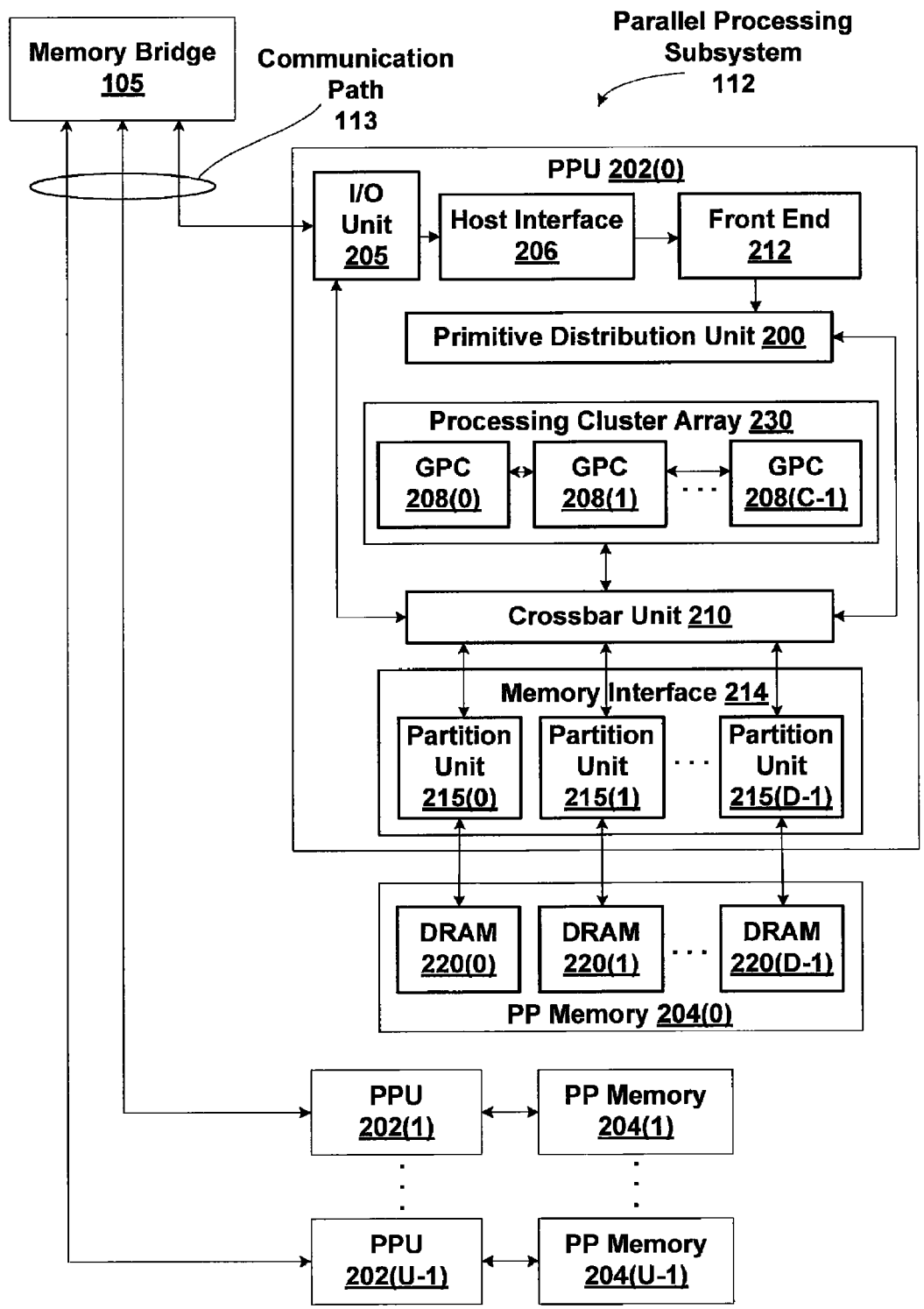
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≧1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
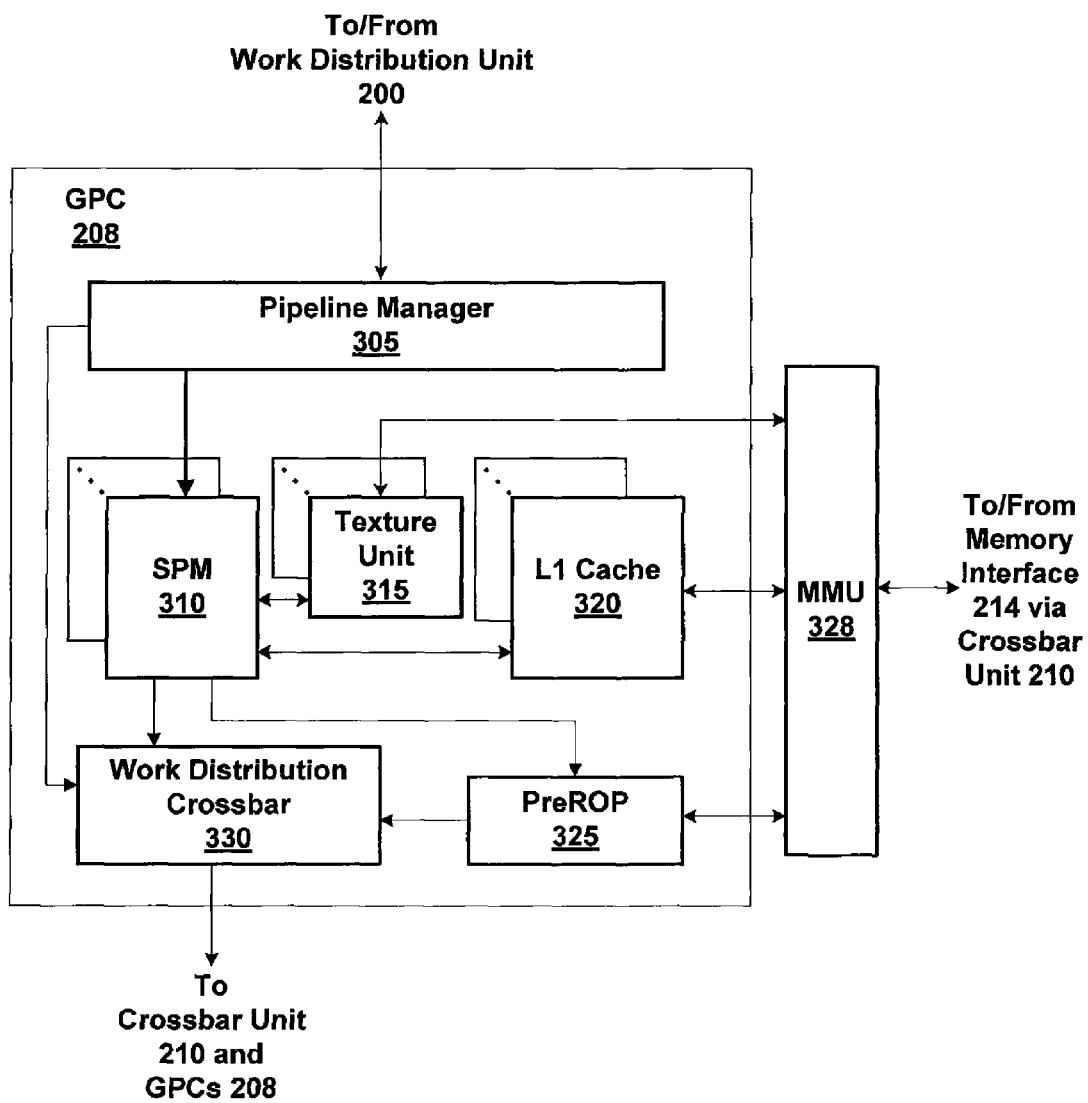
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPC 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≧1, each SPM 310 configured to process one or more thread groups. The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The physical address is processed to distribute surface data access locality to allow efficient request interleaving among partition units. The cache line index may be used to determine whether of not a request for a cache line is a hit or miss.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
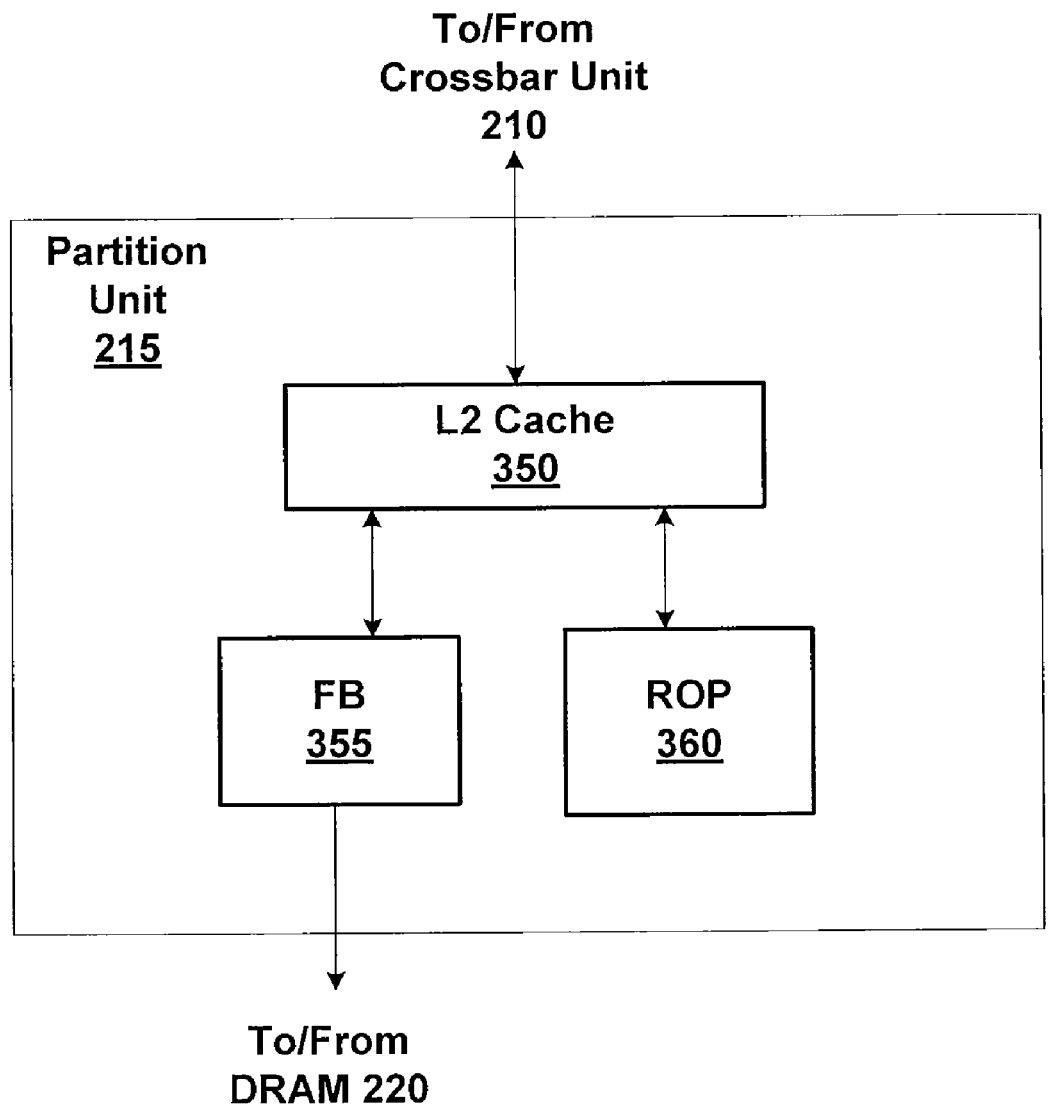
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Figure 4:
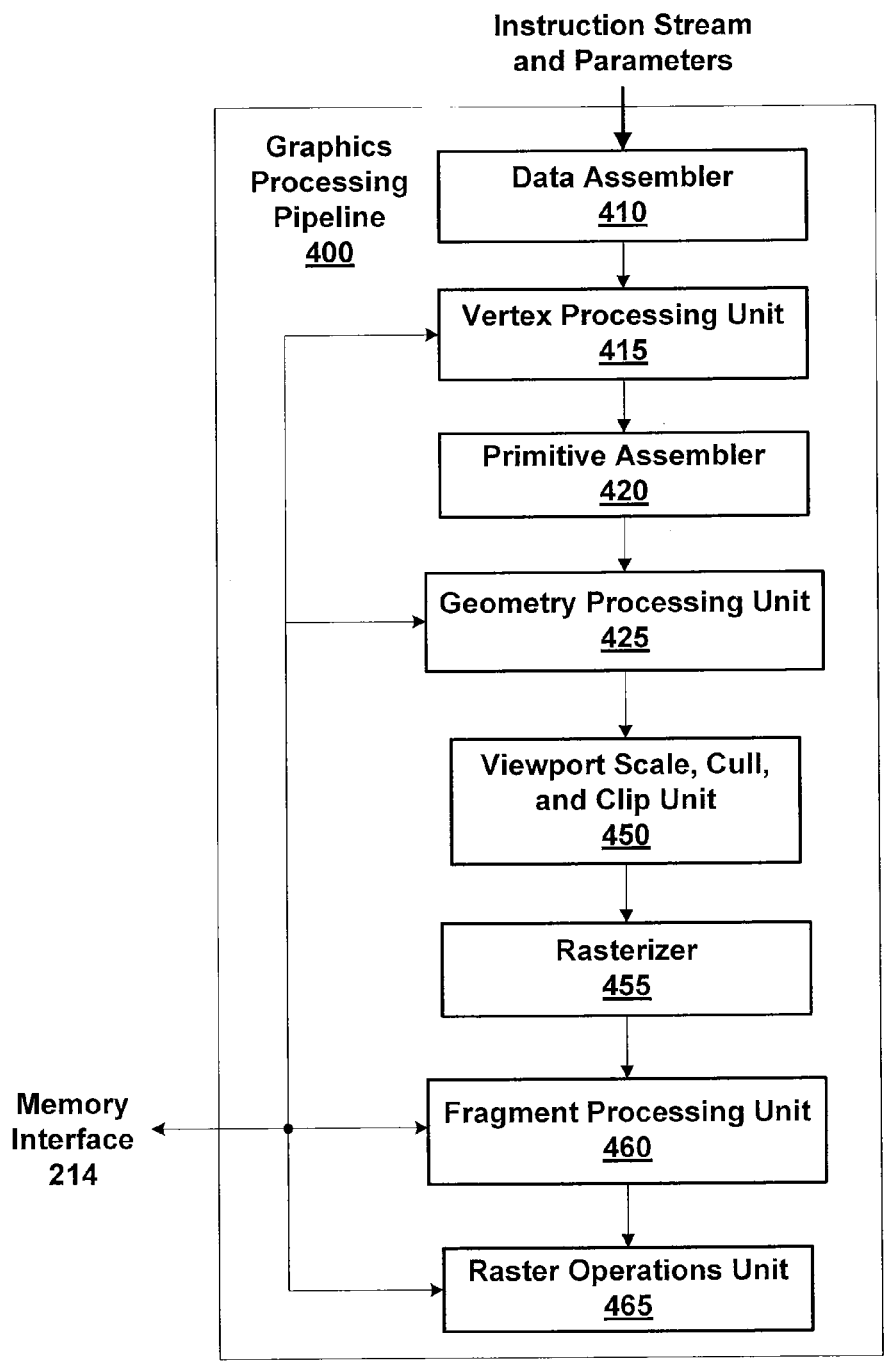
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Translation Look-Aside Buffer with Variable Size Cache Line Coverage

A translation lookaside buffer (TLB) that stores compressed cache lines, but allows fully general address translation from virtual to physical memory spaces that is required when compression is not possible due to the allocation of small buffers or memory data structures. Virtual addressing divides the virtual address space into pages. Each page covers a range of the virtual address space. Page tables map a virtual address to physical addresses. A TLB provides a cache to store page table entries so that the mapping from virtual addresses to physical addresses can be performed quickly. The complete page table, mapping portions of the virtual address space that are allocated to portions of the physical memory, is stored in DRAM 220. Entries of the page table (PTEs) are cached in the TLB. Each PTE describes the mapping for a page of the virtual memory space and includes the physical address of the virtual memory page. The PTE may also include fields that define the attributes of the particular virtual memory page, e.g., read-only, privileged, data format, and the like.

The PTEs may be compressed using a variety of different formats. Some formats represent more PTEs than others. The size of the address space covered by a cache line depends on the page size and compression format of the PTEs stored in the cache line. All cache lines in a particular TLB have the same number of bits, as determined by the format with the most bits so that any of the compressed formats fit in a cache line.

The TLB receives PTE requests that specify a virtual memory page address for translation to a physical memory address. A request results in either a cache miss or cache hit. At the time of a miss, the size of the address space covered by the cache line is unknown. Until the cache line is filled, the page size and compression format are not known. An optimal cache line coverage is established that assumes a certain page size and compression level, e.g., a minimum size cache line corresponding to the minimum page size and highest PTE compression level. In other embodiment the optimal range is determined as a range that will be obtained to fill a cache line in most cases. The optimal cache line coverage becomes the assumed range of the cache line. When a PTE miss occurs in the PTE cache, the TLB allocates a cache line and assumes that the cache line will cover a particular size of the address space when the cache line is filled. In other words, a cache line being filled has an assumed coverage referred to as an assumed range.

While waiting for the fill, the TLB buffers requests that hit the allocated cache line based on the assumed range. However, the cache line may be filled with a format that covers less than the assumed range, the assumed range, or more than the assumed range. When the cache line is filled with a format that covers the assumed range or more than the assumed range all of the buffered requests assigned to the cache line before the fill will be satisfied by the fill. New requests, received after the cache line is filled, may hit the cache line in an expanded range when the filled cache line covers more than the assumed range.

When the cache line is filled with a format that covers less than the assumed range, some buffered requests assigned to the cache line before the fill may not be satisfied by the fill. Buffered requests that cannot be satisfied are reissued. The reissue process allocates one or more cache lines assuming coverage that may be different than the assumed range. In some embodiments, minimal coverage is assumed for cache lines allocated during the reissue process. Assuming coverage that is greater than the minimum may result in the request being reissued again. The assumed address range is chosen to avoid reissues in the majority of cases. The cache hit rate is improved since additional PTEs may be compressed and stored with the requested PTEs in the cache lines compared with storing only the uncompressed requested PTEs. The invention supports high throughput when pages are large or PTEs are highly compressible and supports full generality when pages are small or PTEs have minimal contiguity.

Figure 5A:
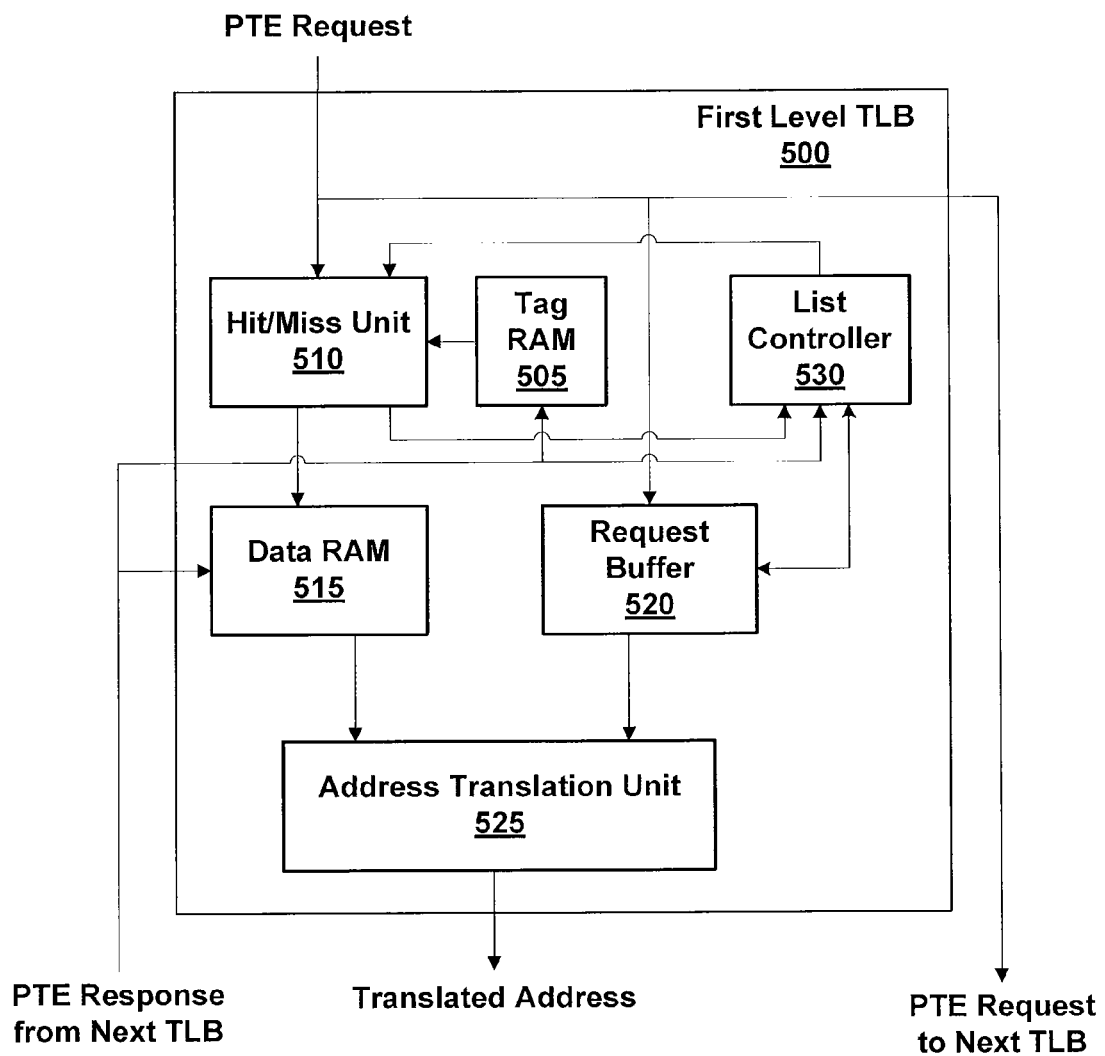
FIG. 5A is a block diagram of a first level TLB within the MMU of FIG. 3A, according to one embodiment of the present invention.
Figure 5B:
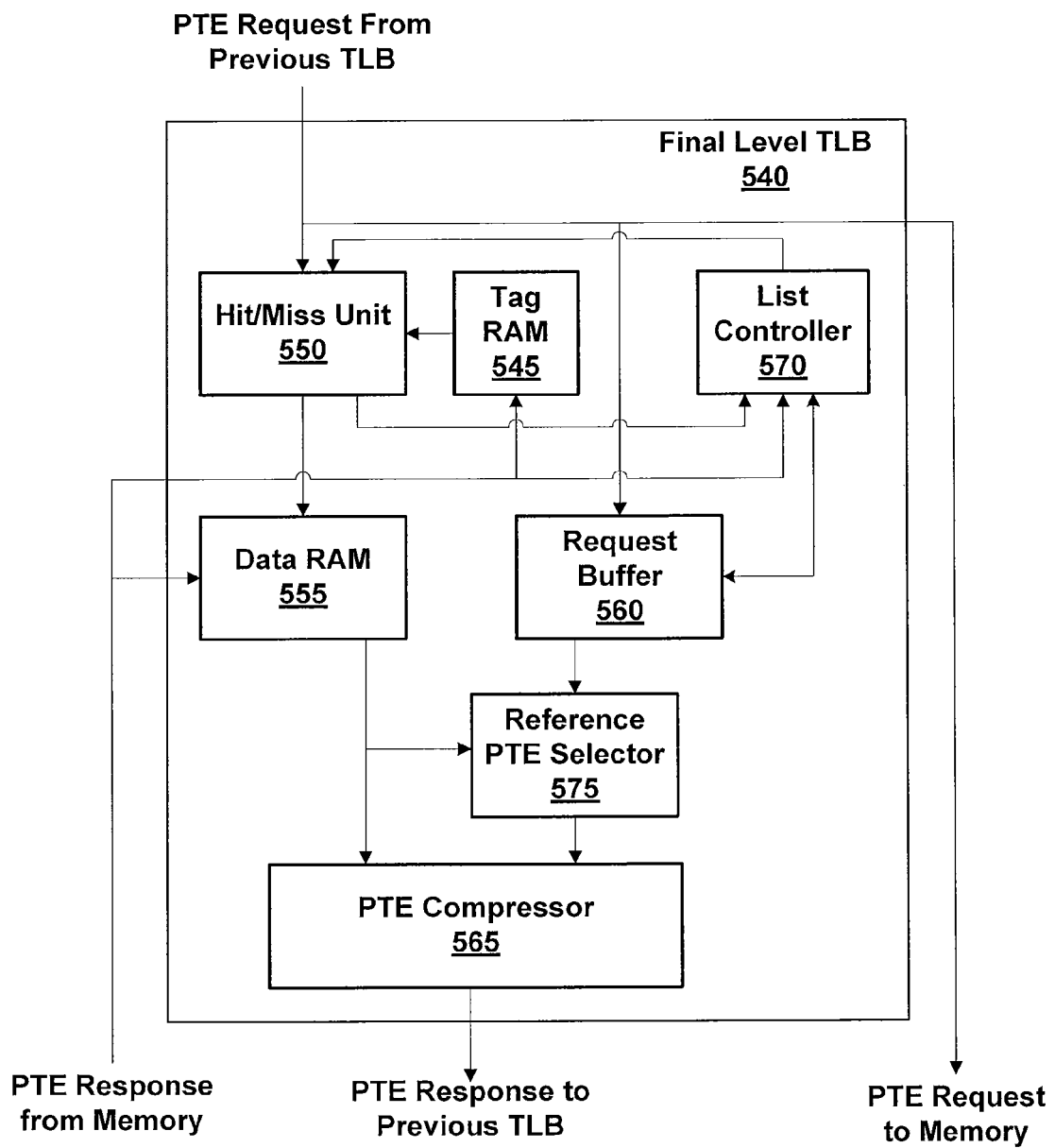
FIG. 5B is a block diagram of a final level TLB within the MMU of FIG. 3A, according to one embodiment of the present invention.

FIG. 5A is a block diagram of a first level TLB 500 within the MMU 328 of FIG. 3A, according to one embodiment of the present invention. In a parallel system, the MMU 328 may include multiple TLBs, often arranged as a hierarchy, with small caches associated with individual processing units (to provide necessary address translation bandwidth), and fewer, larger second- or third-level caches providing backup so misses in the first-level cache do not require PTE fetches from memory. The first level TLB 500 provides the PTE cache and address translation logic for the client. The final level TLB 540 supports the first level TLB 500 by providing the memory interface and PTE compression logic 565. FIG. 5A shows the details of the first level TLB 500. The final level TLB 540 is shown in FIG. 5B. Second-level and third-level TLBs are similar to the first-level TLB 500, but lack the address translation unit 525

The first level TLB 500 includes a hit/miss unit 510, a tag RAM 505, a Data RAM 515, a request buffer 520, a list controller 530, and an address translation unit 525. The first level TLB 520 receives a PTE request and outputs a translated address (physical address corresponding to an address of a virtual memory page specified by the PTE request. The first level TLB 500 is configured to output PTE requests that result in a cache miss to a next TLB, e.g., second-level or final-level TLB. The first level TLB 500 receives PTE responses from the next TLB in the hierarchy.

A TLB cache line consists of a tag and data. The data is stored in the data RAM 515 and the tag is stored in the tag RAM 505. The size of the TLB data storage provided by an entry of data RAM 515 is referred to as the TLB cache line size. Increasing the cache line size reduces the number of tag storage entries in tag RAM 505 required to map a certain amount of memory and generally reduces the frequency of misses. If a PTE maps M bytes of memory, and the data RAM 515 has N cache lines that hold S page table entries, then the first level TLB 500 can map M*N*S bytes of memory.

Specialized devices, such as PPU 202 may need to access both local memory (PP memory 204) and system memory 104. System memory 105 typically has a small page size, mandated by the operating system (e.g. 4 KB), with an arbitrary physical address associated with each PTE. Bandwidth to system memory is typically limited by the memory bridge 105 (e.g. PCIE) connecting the PPU 202 to a chipset or the CPU 102, which may limit the speed of PPU 202. Local memory, attached directly to the PPU 202, typically supports much higher bandwidth, and the operating system may provide allocation contiguity in larger chunks (e.g. 64 KB or 128 KB). To maximize the effective size of the TLBs and to reduce the miss frequency, both of which are important during high-speed rendering, it may be desirable to simultaneously support multiple virtual memory page sizes—small pages for system memory and large pages in video or frame buffer memory. Large virtual memory page sizes can be viewed as a type of PTE compression and clustering.

When the MMU 328 attempts a translation, a PTE request is received by the first level TLB 500 and the hit/miss unit 510 compares the virtual address specified by the PTE request with the contents of a number of the tag entries stored in tag RAM 505. If the virtual address does not match any of the tags, the PTE request "misses" the first level TLB 500. If the virtual address matches one of the tags, the PTE request "hits" the first level TLB 500. Because the data RAM 515 has a limited number of cache lines, allocating a cache line to receive data for a miss may evict a previously filled entry. Note, that in the startup case, the PTE cache will be empty.

In a pipelined system such as a PPU 202, the clients of the MMU 328 typically stream address translation requests to the first level TLB 500 and can tolerate a certain amount of delay in receiving a response. If one request misses in the first level TLB 500, subsequent requests for the same page that are received soon after the one request also miss. Rather than blocking the subsequent requests, which would degrade performance, the first level TLB 500 may support miss-under-miss. The first level TLB 500 may receive a request that matches the tags of a cache line in data RAM 515 with a fill pending. The first level TLB 500 buffers the request by adding it to a list of requests associated with the cache line that are stored in the request buffer 520. The list controller 570 controls the output of the requests stored in request buffer 560 based on writes to the data RAM 515 to fill a cache line. Once the cache line is filled, the first level TLB 500 starts processing the associated requests stored in the request buffer 520. A request that hits a filled cache line can be processed immediately, or it can be buffered in the request buffer 520 while the first level TLB 500 processes other requests.

When the MMU 328 has a hierarchy of TLBs, a PTE request resulting in a miss is forwarded to the next TLB. The next TLB compares the PTE request with tags stored in the next TLB. If no matches are found, the next TLB forwards the PTE request to yet another next TLB. Eventually, the PTE request may miss in a final TLB. To satisfy the miss, the appropriate PTEs are read from memory, a PTE response is created for the final TLB, which is forwarded up the TLB hierarchy. As each TLB, including the first level TLB 500 receives a PTE response, the PTE data is stored in the data RAM 515 at the appropriate cache line, and the cache line is marked as filled. The first level TLB 500 can then process any PTE requests associated with the filled cache line, including any buffered PTE requests stored in the list controller 530.

FIG. 5B is a block diagram of a final level TLB 540 within the MMU 328 of FIG. 3A, according to one embodiment of the present invention. One or more first level TLBs 500 may be included within MMU 328 along with a final level TLB 540 configured as a hierarchy of TLBs. The final level TLB 540 includes a hit/miss unit 550, a tag RAM 545, a data RAM 555, and request buffer 560, a list controller 570, a reference PTE selector 575, and a PTE compressor 565. The hit/miss unit 550, tag RAM 545, list controller 570, data RAM 555, and request buffer 560 perform the same functions as previously described hit/miss unit 510, tag unit 505, list controller 530, data RAM 515, and request buffer 520, respectively. When a single level of TLB is used by the MMU 328, the final level TLB 540 is the only TLB and the final level TLB 540 includes the address translation unit 525 to output a translated address. The final level TLB 540 receives a PTE request (from a previous TLB when a TLB hierarchy is used) and outputs the compressed PTEs. The final level TLB 540 is configured to output PTE requests that result in a cache miss to memory to read the PTE entries. The final level TLB 540 receives PTE responses from the memory and outputs PTE responses to the previous TLB.

Compression of PTEs is possible since adjacent pages of memory often have common attributes. Adjacent pages may be physically contiguous or may have other attributes in common. In such cases, storing complete PTEs in the data rams 515 and 555 wastes storage. If multiple PTEs that share attributes can be stored in a compressed format in a cache line, the effective data size of RAM 515 and 555 is increased and the miss frequency reduced. However, it is generally not possible to compress all PTE entries, since small surfaces and memory objects (with potentially differing attributes) typically need to be allocated using the smallest number of virtual memory pages possible to avoid memory wastage.

Each time the MMU 328 reads a PTE from memory, a block of PTEs is fetched. The PTE compressor 565 creates the highest density format that contains the target PTE, e.g., the PTE specified by the PTE request and one or more other PTEs in the block of PTEs. Thus, the cache line always includes the target PTE and may also include additional PTEs that were not specified in the original PTE request. Several different compression techniques may be used to store multiple PTEs per cache line. For example, common fields for multiple PTEs may be stored once for a cache line. One cache line may be used to map multiple physically contiguous pages. If the physical pages are not physically contiguous, but lie within a certain range, a single base with multiple offsets requires less storage than storing all the physical addresses for multiple PTEs.

The PTE compressor 565 may be configured to use only a single compression technique or to try one or more compression techniques in parallel and select the compression format that achieves the greatest density to pack more information into a cache line. A common field compression technique packs twice as many PTEs per cache line compared with no compression of the PTEs. A base-offset compression technique packs four times as many PTEs per cache line compared with no compression of the PTEs. A contiguous page compression technique may be used to pack PTEs more densely than the other compression methods, but is limited to the same density as base-offset compression. The contiguous page compression requires less bandwidth when transferring data between TLBs.

In a preferred embodiment, a PTE contains a Physical Address PA[27:0], an attribute Q[16:0], an attribute R[9:0], an attribute S[3:0], and a Valid flag. A series of consecutive PTEs may be compressed in a number of formats. The Unique format is used to represent 4 PTEs that cannot be compressed, requiring 4*60=240 bits to store all fields uniquely for the 4 PTEs. The Common R format is used to represent 8 PTEs that share a common R attribute. With one copy of attribute R and all other fields unique, 410 bits are used. The Common Q format is used to represent 8 PTEs that share a common Q attribute. With one copy of attribute Q and all other fields unique, 361 bits are used. The Base-offset format is used to represent 16 PTEs that have common Q, R, and S attributes. With one copy of each of these attributes, 16 valid flags, a base (B[11:0]), and 16 offsets (O[21:0]), 411 bits are used. The Contiguous format is used to represent 16 PTEs with 16 valid flags and one copy of all of the other fields, using only 75 bits. PTEs used for large memory structures can typically be compressed using Contiguous or one of the Common formats, representing 8 to 16 PTEs in a 411 bit cache line. To map 16 pages without compression requires 960 bits. Therefore, compression can be used to effectively increase the size of the data RAMs 515 and 555. Other compression formats can be used.

The block of PTEs read from memory to satisfy a PTE request may contain a mix of valid and invalid PTEs as indicated by the valid flags. To maximize compression, the PTE compressor 565 ignores the contents of invalid PTEs. To make compression repeatable, the reference PTE selector 575 chooses a valid PTE as the reference PTE. The reference PTE determines the value of the common fields in the compression format. The base address for base-offset and contiguous page formats is computed from the physical address of the reference PTE. If the target PTE is valid, then the reference PTE selector 575 uses the target PTE as the reference. If the target PTE is invalid, then the PTE selector 575 must choose a different PTE. The reference PTE will be a valid PTE in the smallest format that contains the target PTE and a valid PTE. The chosen format may be bigger than this format, but will not be smaller. This guarantees that the PTE compressor 565 will produce the same results regardless of the target PTE.

Without repeatability, cache lines with different formats can represent overlapping memory spaces. The hit/miss unit 510 would not be able to properly determine which of the cache lines should receive new requests when a PTE request hits more than one cache line. Two requests to the same virtual memory page could end up on different cache lines, causing request ordering problems since the TLBs are designed to preserve request order on a cache line basis. Any sequence of requests to a particular virtual memory page will be translated in the order received. Specific rules for assigning requests to cache lines prevent ordering errors.

Figure 5C:
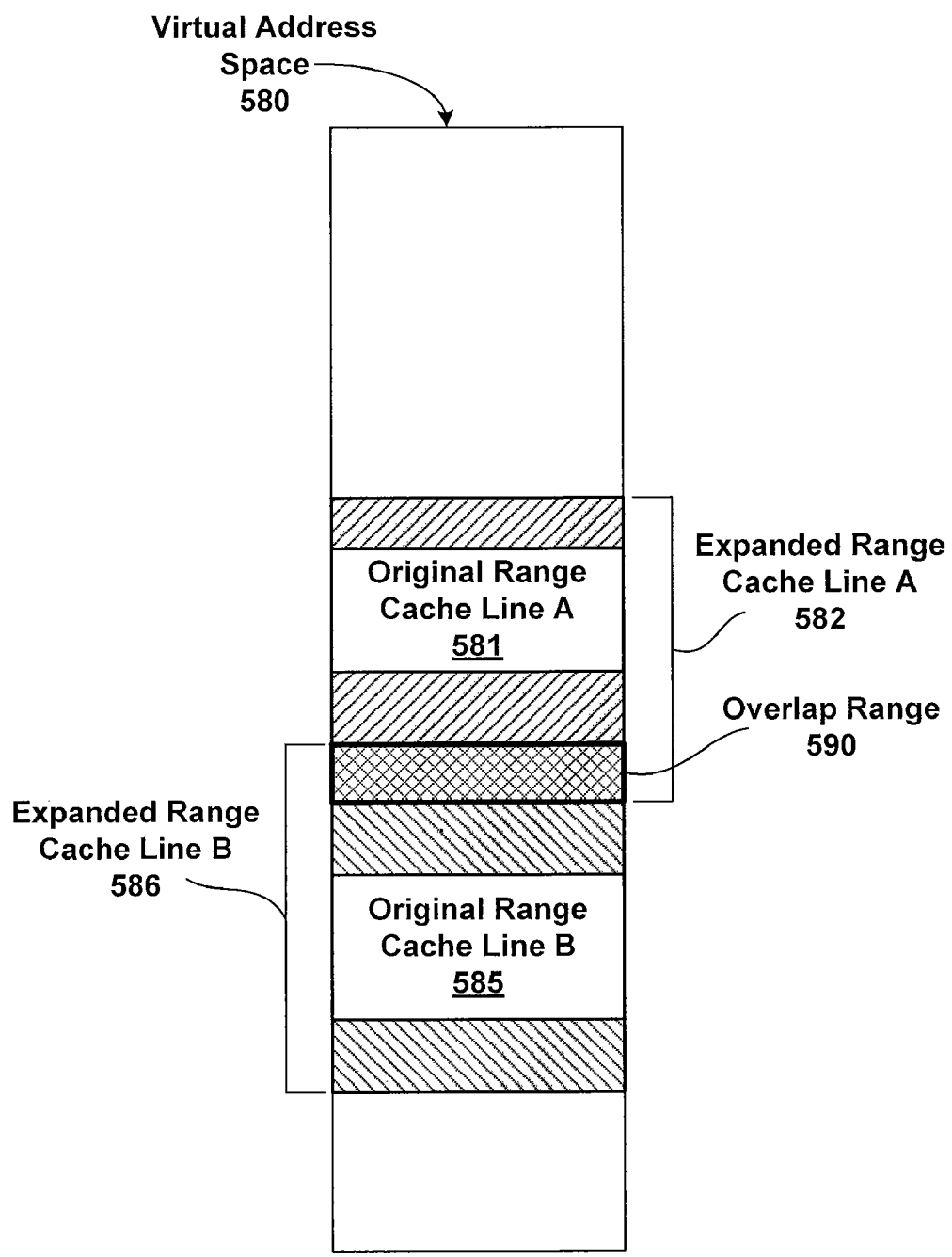
FIG. 5C illustrates an overlap between expanded ranges of cache lines in the virtual address space, according to one embodiment of the present invention.

FIG. 5C illustrates an overlap between expanded ranges of cache lines in the virtual address space 580, according to one embodiment of the present invention. The assumed range of a cache line is determined at the time the cache line is allocated to store data in response to a miss. The expanded range is determined when the cache line is filled. The expanded range is the result of multiple PTEs that are included in the block of PTEs read from memory. Since the multiple PTEs are compressed to produce a cache line of varying coverage, the expanded range cannot be determined until after the cache line is filled. The TLB tag RAM 505 or 545 stores the assumed and expanded ranges of the cache lines. Because cache lines may be filled at higher than the assumed density, two or more cache lines may overlap in coverage of virtual pages.

In one embodiment, each cache line has a single bit that selects whether cache line coverage is the assumed range or an actual range. If the bit is not set, the assumed range is used. In one embodiment, the assumed range is configurable via control registers, allowing it to be programmed to optimize performance on a range of applications. If the bit is set, the cache line coverage is the minimal range. The bit is set for any cache line allocated during reissue mode. Since the assumed range is determined by this bit, the assumed range does not change when the cache line is filled. However, for any filled cache line to be hit, the request has to hit the actual range. Since the actual range is a subset of the assumed range in this case, the effective assumed range is limited to the actual range. In effect, the assumed range is set to the actual range.

As shown in FIG. 5C, the assumed range of cache line A 581 does not overlap with the assumed range of cache line B 585. However, the corresponding expanded ranges of cache line A 582 and cache line B 586 do overlap, as indicated by the overlap range 590. In order to ensure that a request that hits within the overlap range 590 is assigned to only one of cache line A or cache line B, only one of the expanded ranges may be enabled, e.g., marked as expanded.

To accomplish this, a set of rules controls the assignment of requests to cache lines. Any request that hits the assumed range of a non-empty cache line must be assigned to that cache line. The request may hit the expanded range of other cache lines, but the request can only hit one cache line in the assumed range. A request that hits the expanded range of multiple cache lines may be assigned to any one of the hit cache lines. One cache line is chosen, and marked as expanded. In some embodiments, the other hit cache lines are marked for eviction. The eviction happens when the cache line is empty or does not have any queued miss-under-miss responses. In some embodiments, the other cache lines will be evicted when a new cache line must be allocated. Once a cache line is marked as expanded, the expanded cache line has priority over any other overlapping cache lines for receiving new requests. For example, when a request hits in the overlap range 590, the request may be assigned to the cache line A and cache line A is then marked as expanded. Cache line B is marked for eviction and can only produce a hit for assumed range cache line B 585 until after cache line B is evicted and replaced.

A side effect of supporting variable size cache line coverage is that the number of PTEs that may be stored in unfilled cache lines is not known. The MMU 328 may assume that each unfilled cache line will be filled with the PTEs represented using the lowest density compression. However, unnecessary cache line evictions and PTE requests will result for assuming the lowest density compression. For more efficient use of the caches, a more optimistic density, such as the optimal cache line coverage, may be assumed for unfilled cache lines. When a cache line is filled at the assumed density, or at a higher density, then the TLB is able to process all of the buffered requests without reissuing any of the buffered requests since the compressed PTEs represent at least the assumed range. However, the cache line may be filled at a lower density when the compression produces a cache line having a density that is less than the assumed density. Buffered requests associated with the cache line (based on the assumed range) may not be satisfied and the TLB must reissue those requests.

To reissue a request, the list controller 530 moves the unsatisfied requests from a request list in the request buffer 520 for the cache line, to a reissue request list in the request buffer 520. Once the cache line's request list is empty, the list controller 530 outputs requests in the reissue request list for translation by the address translation unit 525. At the start of reissue list processing, the originally allocated optimal size cache line is empty, and may be allocated for processing the reissued request. The cache line allocated for the original miss is empty because all the requests that were satisfied by the fill were translated. All the requests not satisfied by the fill were moved to the reissue list. There may or may not be other cache lines available at the start of reissue list processing. To allow cache lines to free up sooner, the TLB may be configured to stop accepting new requests until all of the pending reissue requests have been reissued.

The TLB treats the reissued requests using the same process as the original requests, except that the minimum density is assumed for unfilled cache lines. In some embodiments, the minimum density assumes that the unique format will be used to compress the PTEs. In other embodiments, the minimum density assumes that the coverage size of the cache line is greater than the minimum size cache line. The cache line density of a reissued request will always be less than the cache line density assumed for the original request. Cache lines that store compressed PTEs for reissued requests are marked as reissued and cannot be hit in the expanded range. In other words, the cache lines storing compressed PTEs for reissued requests cannot be marked as expanded until those cache lines are evicted and replaced.

The TLBs, e.g., first level TLB 500 and final level TLB 540, and potentially multiple intervening TLBs, enables address translation for the MMU 328 to perform high-speed processing when accessing local memory. Various buffer sizes may be allocated in virtual memory address space and translated by the TLBs into physical memory addresses in system memory 104 and/or PP memory 204. The PTEs may be represented in a variety of compression formats that take advantage of common types of coherence (physical addresses and/or buffer attributes). A minimum size cache line (in virtual memory space) is determined based on the compression formats. The optimal coverage cache line is allocated to store compressed PTEs when a miss occurs for a PTE request. Requests for pending fills are buffered while the PTEs are read from memory and compressed. When the coverage of the compressed PTEs is less than the assumed range and one or more of the buffered requests misses, a minimal coverage cache line is allocated and the buffered requests that miss are reissued to read the necessary PTEs from memory.

Based on important performance scenarios, such as clears, rendering narrow lines, particle systems, etc. (which maximize the rate at which virtual memory pages are traversed) a miss rate is determined based on the target miss granularity. TLBs in the hierarchy and the interconnections between the TLBs are designed to support this miss rate. It may be advantageous for higher-level TLBs to use coarser TLB entries, so the higher-level TLBs reduce the miss rates to upstream TLBs in the hierarchy.

Figure 6:
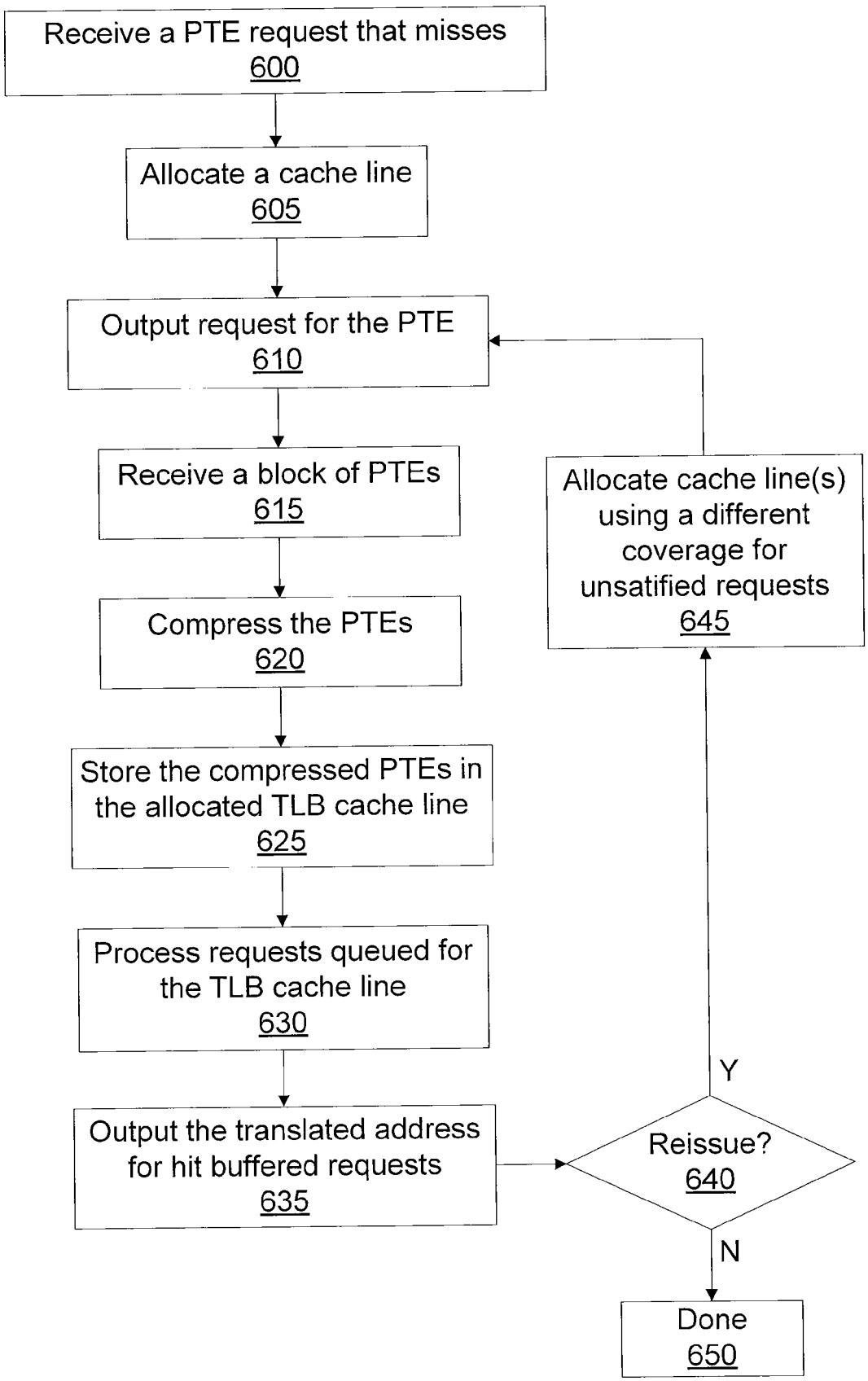
FIG. 6 is a flow diagram showing steps for processing a PTE request that misses, according to one embodiment of the present invention.

FIG. 6 is a flow diagram showing steps for processing a PTE request that misses, according to one embodiment of the present invention. At step 600 a TLB (first level TLB 500 or final level TLB 540) receives a PTE request for PTE data that is not stored in the TLB, i.e., a miss occurs. At step 605 a cache line is allocated for storing the PTE data in the data RAM 515 or 555 of the TLB. The allocated cache line is assumed to have coverage of an assumed range and any requests that are received while the cache line has a fill pending are buffered for processing after the cache line is filled. The assumed range may correspond to the optimal coverage. At step 610 a request is output by the TLB to retrieve the PTE data from memory. At step 615 a block of PTEs, including the target PTE specified by the request is received by the TLB. At step 620 the PTE data is compressed to produce compressed PTE data. In one embodiment, the page table itself is compressed and step 620 is omitted.

At step 625 the compressed PTE data is stored in the allocated cache line. At step 630 any requests queued for the cache line are processed. The TLB translates requests that hit the coverage range of the newly filled cache line. Any requests that fall outside the coverage range of this newly filled cache line are transferred to a reissue request list.

At step 635 Buffered PTE requests that are not transferred to the reissue list are translated and the translated addresses are output by the TLB. If, at step 640 there are no PTE requests in the reissue list, then at step 650 the processing of the PTE request is complete. Otherwise, at step 645 one or more cache lines are allocated to store the compressed PTE data to satisfy those requests, and the method returns to step 610 to reissue a request to read the PTE data from memory. The allocated cache line(s) is assumed to have a minimum coverage (different than the assumed coverage assumed in step 605) to ensure that the reissued request is satisfied without requiring any more reissued requests. In other embodiments, other coverages may be assumed for the cache lines allocated to process reissued requests, where that coverage is also different than the optimal coverage used for the original allocation in step 605.

Figure 7:
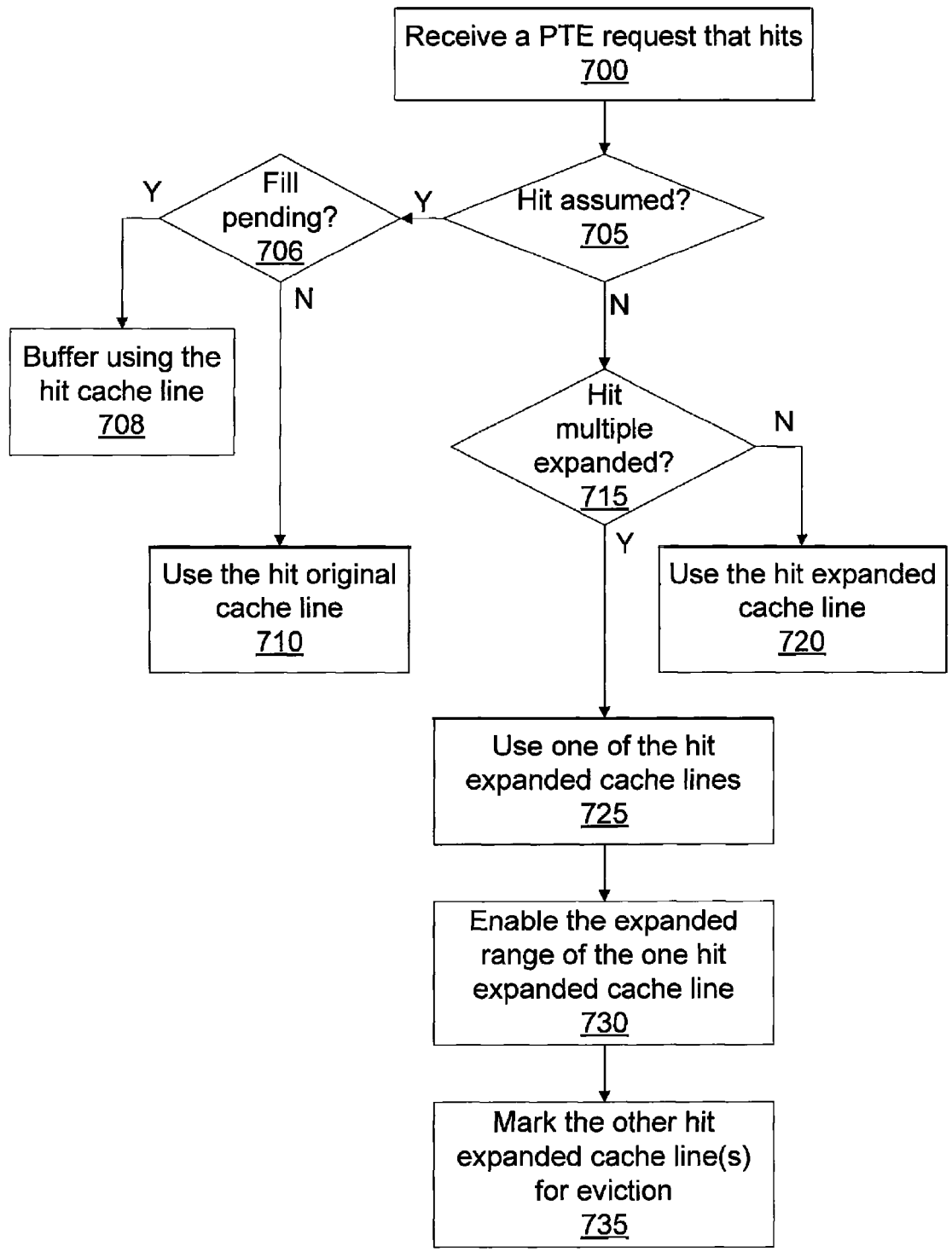
FIG. 7 is a flow diagram showing steps for processing a PTE request that hits, according to one embodiment of the present invention.

FIG. 7 is a flow diagram showing steps for processing a PTE request that hits, according to one embodiment of the present invention. At step 700 the TLB receives a PTE request for a virtual memory address that hits at least one cache line storing compressed PTE data. In step 705 the TLB determines if any of the hits is within the assumed range specified by the PTE data, and, if so, then at step 706 the TLB determines if the cache line that is hit has a fill pending. If a fill is pending, then at step 708 the PTE request is buffered for the cache line. Otherwise, if the cache line is already filled, then at step 710 the cache line having the assumed range that is hit is read, i.e., the PTE request is assigned to the cache line having the assumed range that is hit.

If, in step 705 the TLB determines that none of the cache lines that are hit are hit within the assumed range, then at step 715 the TLB determines if more than one cache line is hit within the expanded range of the cache line. If, in step 715 only a single cache line is hit in the expanded range, then at step 720 the cache line that is hit in the expanded range is read, i.e., the PTE request is assigned to the cache line having the expanded range that is hit.

If, in step 715 multiple cache lines are hit in the expanded range, then at step 725 one of the hit cache lines is read, i.e., the PTE request is assigned to only one of the cache lines with the hit in the expanded range. At step 730 the expanded range of the one cache line that the PTE request is assigned to is enabled. At step 735 the other cache lines that were hit in the expanded range are marked for eviction. The PTE data that is read in step 710, 720, or 725 is used to translate the virtual memory page specified by the PTE request into a translated address.

By storing compressed PTE in cache lines with variable coverage sizes the miss frequency of the TLB is reduced. When the TLB is not large enough to hold the working set of PTEs, which may be the case for graphics applications where the working set of PTEs is usually the data accessed in an entire frame, reducing the number of PTE misses becomes more important to improve performance. Reducing the number of PTE misses reduces the average TLB access latency.

Transmitting compressed PTEs between different levels of TLBs within the MMU 328 also reduces the amount of data that is transferred to process misses compared with transmitting non-compressed PTEs. The number of PTEs stored in an entry may vary depending on how densely the target PTE and one or more additional PTEs can be compressed. The additional PTEs allow for the cache lines to have an expanded range that increases the frequency of hits. Finally, allocating cache lines assuming an optimal cache line coverage reduces the bandwidth needed to fetch PTEs from memory and pass them to the TLBs, but requires PTE requests to be reissued when the actual coverage of the compressed PTEs does not satisfy requests that are buffered for the cache line. Although the TLBs are described in the context of a graphics processing pipeline, the techniques are applicable to other virtual memory systems that benefit from fast access to portions of memory with certain coherence properties, yet at the same time require general access to any portion of memory.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for storing page table entries in cache lines of a translation look-aside buffer (TLB), comprising:
   receiving a first page table entry (PTE) request for PTE data that is not stored in the TLB;
   allocating a first cache line in the TLB for storing the PTE data, wherein the allocated first cache line is assumed to cover an assumed range of a virtual address space;
   retrieving the PTE data from memory;
   compressing the PTE data to produce compressed PTE data;
   storing the compressed PTE data in the allocated first cache line;
   determining an actual range of the virtual address space that is covered by the compressed PTE data; and
   storing the actual range as an extended range when the actual range is greater than the assumed range, or storing the actual range as the assumed range when the actual range is less than the assumed range.

2. The method of claim 1, further comprising buffering a second PTE request for additional PTE data, the second PTE request specifying a virtual memory address within the assumed range before the compressed PTE data is stored in the first cache line.

3. The method of claim 2, further comprising the steps of:
   allocating a second cache line in the TLB for storing the additional PTE data needed to process the second PTE request; and
   reissuing a request to retrieve the additional PTE data from the memory when the virtual memory address is not within the actual range, wherein the allocated second cache line is assumed to cover a range that is smaller than the assumed range of the first cache line.

4. The method of claim 3, wherein the step of reissuing the request to retrieve the additional PTE data from the memory further comprises transferring the second request to a reissue list for processing in a manner that preserves the order of PTE requests to a particular page of the virtual address space.

5. The method of claim 1, further comprising the step of receiving a second PTE request specifying a virtual memory address that is within the assumed range of the first cache line and within an expanded range of a second cache line stored in the TLB.

6. The method of claim 5, further comprising the step of marking the second cache line for eviction.

7. The method of claim 1, further comprising the step of receiving a second PTE request specifying a virtual memory address that is not within the assumed range of the first cache line and is within both the expanded range of the first cache line and an expanded range of a second cache line stored in the TLB.

8. The method of claim 7, further comprising the steps of:
   enabling the expanded range of the first cache line; and
   marking the second cache line for eviction.

9. The method of claim 1, wherein the retrieving of the PTE data from the memory comprises retrieving additional PTE data from the memory, and the additional PTE data is compressed with the PTE data to produce the compressed PTE data.

10. The method of claim 1, wherein the TLB is a first level TLB and a final level TLB receives the first PTE request from the first level TLB and performs the steps of retrieving the PTE data from memory and compressing the PTE data to produce the compressed PTE data.

11. A computer-readable storage medium storing instructions that, when executed by a processor including a translation look-aside buffer (TLB), cause page table entries to be stored in cache lines of the TLB, by performing the steps of:
   receiving a first page table entry (PTE) request for PTE data that is not stored in the TLB;
   allocating a first cache line in the TLB for storing the PTE data, wherein the allocated first cache line is assumed to cover an assumed range of a virtual address space;
   retrieving the PTE data from memory;
   compressing the PTE data to produce compressed PTE data;
   storing the compressed PTE data in the allocated first cache line;
   determining an actual range of the virtual address space that is covered by the compressed PTE data; and
   storing the actual range as an extended range when the actual range is greater than the assumed range, or storing the actual range as the assumed range when the actual range is less than the assumed range.

12. A system for storing page table entries in cache lines, the system comprising:
   a memory storing page table entry (PTE) data;
   a translation look-aside buffer (TLB), configured to:
      receive a first PTE request for PTE data that is not stored in the TLB;
      allocate a first cache line in the TLB for storing the PTE data, wherein the allocated first cache line is assumed to cover an assumed range of a virtual address space;
      retrieve the PTE data from the memory;
      compress the PTE data to produce compressed PTE data;
      store the compressed PTE data in the allocated first cache line;
      determine an actual range of the virtual address space that is covered by the compressed PTE data; and
      store the actual range as an extended range when the actual range is greater than the assumed range, or store the actual range as the assumed range when the actual range is less than the assumed range.

13. The system of claim 12, wherein the TLB is further configured to buffer a second PTE request for additional PTE data before the compressed PTE data is stored in the first cache line, wherein the second PTE request specifies a virtual memory address within the assumed range.

14. The system of claim 13, wherein the TLB is further configured to:
 allocate a second cache line in the TLB for storing the additional PTE data needed to process the second PTE request; and
 reissue a request to retrieve the additional PTE data from the memory when the virtual memory address is not within the actual range, wherein the allocated second cache line is assumed to cover a range that is smaller than the assumed range of the first cache line.

15. The system of claim 13, wherein the TLB is further configured, when the request to retrieve the additional PTE data from the memory is reissued, to transfer the second request to a reissue list for processing in a manner that preserves the order of requests to a particular page of the virtual address space.

16. The system of claim 12, wherein the TLB is further configured to receive a second PTE request specifying a virtual memory address that is within the assumed range of the first cache line and within an expanded range of a second cache line stored in the TLB.

17. The system of claim 16, wherein the TLB is further configured to mark the second cache line for eviction.

18. The system of claim 12, wherein the TLB is further configured to receive a second PTE request specifying a virtual memory address that is not within the assumed range of the first cache line and is within both the expanded range of the first cache line and an expanded range of a second cache line stored in the TLB.

19. The system of claim 18, wherein the TLB is further configured to:
 enable the expanded range of the first cache line; and
 mark the second cache line for eviction.

20. The system of claim 12, wherein the TLB includes a first level TLB and a final level TLB that is coupled between the first level TLB and the memory, wherein the final level TLB is configured to receive the first PTE request from the first level TLB and retrieve the PTE data from the memory and compress the PTE data to produce the compressed PTE data.

* * * * *